United States Patent
Noda

(10) Patent No.: US 9,858,088 B2
(45) Date of Patent: *Jan. 2, 2018

(54) TERMINAL DEVICE AND WIRELESS COMMUNICATION SYSTEM

(71) Applicant: PANASONIC INTELLECTUAL PROPERTY MANAGEMENT CO., LTD., Osaka (JP)

(72) Inventor: Masaaki Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,389

(22) Filed: Jun. 15, 2017

(65) Prior Publication Data

US 2017/0293493 A1 Oct. 12, 2017

Related U.S. Application Data

(63) Continuation of application No. 14/913,362, filed as application No. PCT/JP2014/005295 on Oct. 20, 2014.

(Continued)

(51) Int. Cl.
*H04W 76/02* (2009.01)
*G06F 9/44* (2006.01)
(Continued)

(52) U.S. Cl.
CPC ............ *G06F 9/4416* (2013.01); *G06F 1/263* (2013.01); *G06F 9/4406* (2013.01); *H04W 60/00* (2013.01)

(58) Field of Classification Search
CPC .................................................... H04W 76/02
See application file for complete search history.

(56) References Cited

U.S. PATENT DOCUMENTS 6,324,603 B1 * 11/2001 Niizuma ............... H04L 7/0008
332/100
7,724,650 B2 * 5/2010 Karam ...................... H04L 1/22
340/425.2
(Continued)

FOREIGN PATENT DOCUMENTS

EP 2 312 914 A1 4/2011
JP 2004-046577 A 2/2004
(Continued)

OTHER PUBLICATIONS

The Extended European Search Report dated Sep. 8, 2016 for the related European Patent Application No. 14861050-4.
(Continued)

*Primary Examiner* — Daniel Lai
*Assistant Examiner* — Frank Donado
(74) *Attorney, Agent, or Firm* — McDermott Will & Emery LLP

(57) ABSTRACT

A terminal device is capable of communicating with a master wireless device. The terminal device includes a control circuit. The control circuit has operating modes including a normal mode for outputting startup information relating to startup of the terminal device, and a registration mode for outputting registration information relating to registration with the master wireless device. One of the operating mode of the control circuit shifts to the registration mode based on timing of plural startups of the terminal device. The terminal device can shift to the registration mode using the same operation and mechanism as operating in the normal mode.

17 Claims, 11 Drawing Sheets

Related U.S. Application Data

(60) Provisional application No. 61/901,007, filed on Nov. 7, 2013.

(51) Int. Cl.
*G06F 1/26* (2006.01)
*H04W 60/00* (2009.01)

(56) References Cited

U.S. PATENT DOCUMENTS

| | | |
|---|---|---|
| 2003/0215780 A1 | 11/2003 | Saar et al. |
| 2004/0252985 A1* | 12/2004 | Nonaka ............... G11B 27/002 386/248 |
| 2005/0078683 A1 | 4/2005 | Page |
| 2009/0058361 A1 | 3/2009 | John |
| 2010/0262696 A1 | 10/2010 | Oshiba |
| 2011/0080091 A1* | 4/2011 | Staab ................ H05B 37/0227 315/61 |
| 2012/0225654 A1 | 9/2012 | Junela et al. |
| 2013/0132501 A1 | 5/2013 | Vandwalle et al. |
| 2013/0159956 A1 | 6/2013 | Verghese et al. |
| 2013/0171939 A1 | 7/2013 | Tian et al. |
| 2013/0215902 A1 | 8/2013 | Lamb et al. |
| 2013/0322461 A1* | 12/2013 | Poulsen ................... H04J 3/02 370/458 |
| 2013/0322462 A1 | 12/2013 | Poulsen |
| 2014/0182378 A1 | 7/2014 | Loverich et al. |
| 2014/0244040 A1* | 8/2014 | Alberth, Jr. ......... H04L 12/2803 700/275 |
| 2015/0372539 A1 | 12/2015 | Livadaras et al. |

FOREIGN PATENT DOCUMENTS

| | | |
|---|---|---|
| JP | 2004-096429 A | 3/2004 |
| JP | 2009-105667 A | 5/2009 |
| WO | 2009/060863 A1 | 5/2009 |
| WO | 2013/142913 A1 | 10/2013 |

OTHER PUBLICATIONS

International Search Report of PCT Application No. PCT/JP2014/005295 dated Jan. 13, 2015.
Communication pursuant to Article 94(3) EPC dated Aug. 9, 2017 for the related European Patent Application No. 14861050.4.

* cited by examiner

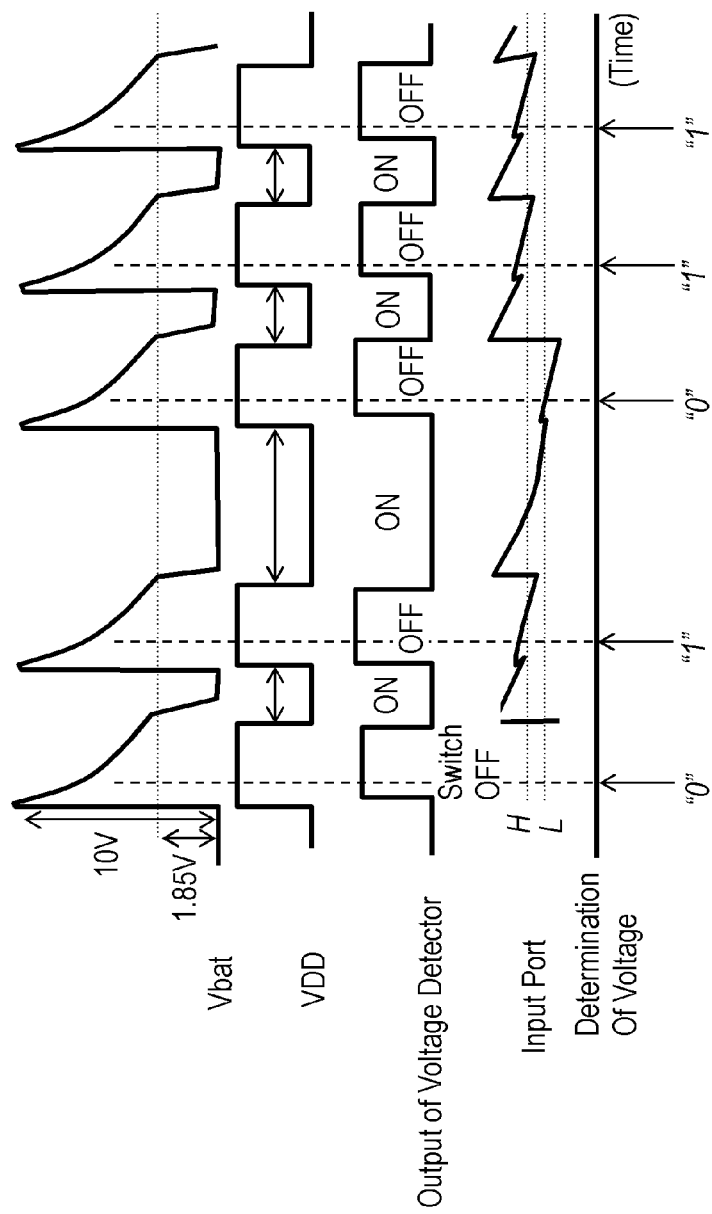

TERMINAL DEVICE AND WIRELESS COMMUNICATION SYSTEM

RELATED APPLICATIONS

This application is a Continuation application of U.S. patent application Ser. No. 14/913,362, filed on Feb. 20, 2016, which is the U.S. National Phase under 35 U.S.C. §371 of International Patent Application No. PCT/JP2014/005295, filed on Oct. 20, 2014, which in turn claims the benefit of U.S. Patent Provisional Application No. 61/901,007, filed on Nov. 7, 2013, the disclosures of which applications are incorporated by reference herein.

TECHNICAL FIELD

The present invention relates to a terminal device and a wireless communication system.

BACKGROUND ART

A wireless communication system includes a master wireless device and a terminal device capable of communicating with the master wireless device. Some examples of such wireless communication systems will be described below.

A wireless communication system is adapted to collect biomedical information, such as pulses of a subject under the examination. In this wireless communication system, a terminal device is attached to the subject, and collects biomedical information of the subject. The terminal device then transmits the biomedical information to a master wireless device via wireless communications.

Another wireless communication system is used by a manager of a building to collect power consumption information from load circuits in a distribution panel. A terminal device is disposed inside the distribution panel, and collects an amount of the electric power supplied to each of the load circuits as the power consumption information. The terminal device transmits the power consumption information to a master wireless device via wireless communications.

In these wireless communication systems, the terminal device is paired with the master wireless device when initialized so as to ensure that the terminal device does not transmit the information to an unrelated master wireless device. This pairing is called as registration hereinafter. Once the registration is completed, communications of the information are established between the terminal device and the master wireless device.

Some conventional systems similar to the above wireless communication systems are disclosed in the patent literatures listed below.

CITATION LIST

Patent Literature

PTL 1: Japanese Patent Laid-Open Publication, No. 2004-096429
PTL 2: Japanese Patent Laid-Open Publication, No. 2009-105667

SUMMARY

A terminal device is capable of communicating with a master wireless device. The terminal device includes a power generator and a control circuit. The power generator is configured to generate electric power by energy-harvesting utilizing energy generated by movement of the terminal device and supply a power-supply voltage based on the electric power to the control circuit. The control circuit has operating modes including a normal operating mode for outputting startup information relating to startup of the terminal device, and a registration mode for outputting registration information relating to registration of the terminal device with the master wireless device. The control circuit shifts one of the operating modes to the registration mode based on timing of a plurality of startups of the terminal device. The terminal device obtains information of the timing of the plurality of startups of the terminal device as an output pattern. When a waveform of the power-supply voltage rises, the control circuit obtains a digit composing the output pattern based on a time interval from a preceding startup of the terminal device to a next startup of the terminal device. The control circuit shifts the normal operating mode to the registration mode when the output pattern coincides with a predetermined output pattern and otherwise keeps the operation mode in the normal operating mode.

BRIEF DESCRIPTION OF DRAWINGS

FIG. 11 is a timing chart of an operation of a control circuit of the terminal device according to Embodiment 3 shifting to a registration mode.

DETAIL DESCRIPTION OF PREFERRED EMBODIMENTS

Exemplary embodiments of the present invention will be described below with referring to the accompanying drawings. The following embodiments are examples of the present invention, and do not be construed as limiting the scope of the present invention.

1. Exemplary Embodiment 1

1-1. General Outline

Figure 1:
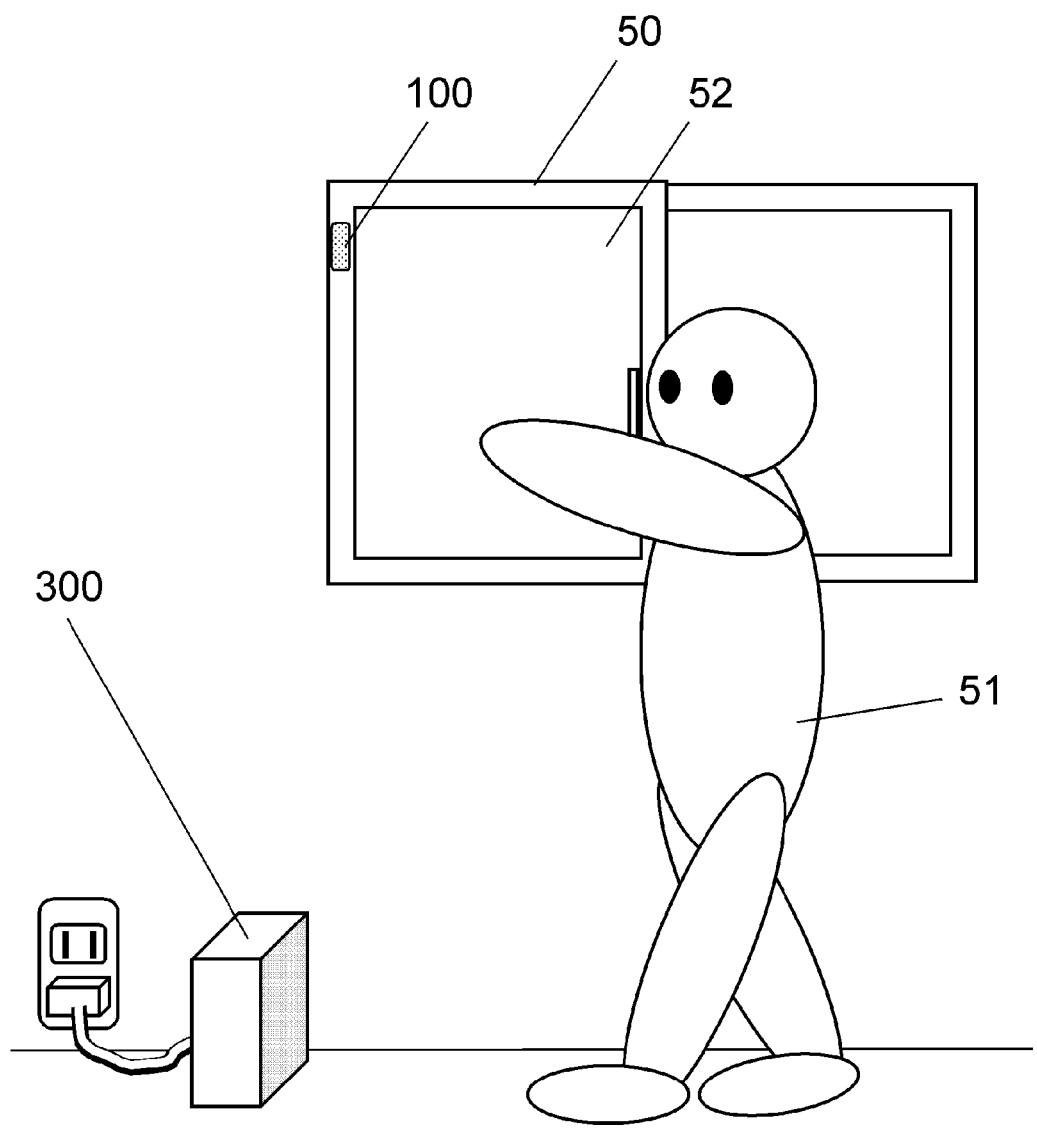
FIG. 1 is a schematic view of a wireless communication system according to Exemplary Embodiment 1 for illustrating an overall configuration thereof.

FIG. 1 schematically illustrates an overall configuration of a wireless communication system according to Exemplary Embodiment 1. This wireless communication system is used for detecting opening and closing of a window to check whether or not the window is carelessly left open, or to check presence or absence of an intruder through the window. This wireless communication system is an energy-harvesting wireless system featuring extremely low-power consumption.

The wireless communication system according to Embodiment 1 includes master wireless device 300 and terminal device 100. Terminal device 100 is mounted inside window frame 50. Master wireless device 300 is located away from terminal device 100. User 51 of this wireless communication system is, for instance, a construction worker of the window or a resident of the house. An operation by user 51 to open or close window 52 causes terminal device 100 to generate electricity, and to inform master wireless device 300 of the opening or closing of window 52. Terminal device 100 is registered or paired with that master wireless device 300 when they are initialized. Once the registration is completed, master wireless device 300 and terminal device 100 hold a registered relationship. This allows communications of information to be established between the devices. In the case that plural windows are monitored as objects, the same number of terminal devices 100 as the windows may be prepared and mounted to the windows. Master wireless device 300 establishes registered relationship with each of terminal devices 100.

A registration method which is different from that of Embodiment 1 for a comparison with Embodiment 1 will be described below. In this method, a terminal device includes a switch for shifting an operating mode of the terminal device to a registration mode. When the user turns on the switch, the terminal device transmits registration information, such as an identifier, of the terminal device and an encryption key to a master wireless device. The registration is completed when the master wireless device receives and stores the registration information.

Another registration method will be described below. In this method, the user starts a terminal device in a normal operating mode by opening and closing a window. This causes the terminal device to transmit startup information, such as an identifier, of the terminal device and encrypted data relating to the opening and closing of the window to a master wireless device. The master wireless device inquires a database of a server of an encryption key of the terminal device based on the identifier. The registration is completed when the master wireless device stores the encryption key obtained from the database.

In the former registration method, the user needs to push the switch of the terminal device. This method therefore prevents the terminal device from being installed inside a building fixture, such as a window frame. The terminal device may have a large size in order to provide the terminal device with a mechanism that is different from the mechanism used in the normal mode. Moreover, in the latter registration method, the master wireless device is required to inquire the database of registration information. Therefore, the wireless communication system cannot self-conclude the registration tasks. In addition, it may take time to inquire the database. Furthermore, considerable efforts may become necessary to configure the system, and to manage and control the data.

In the wireless communication system according to Embodiment 1, in contrast to these registration methods, user 51 opens and closes window 52 plural times according to predetermined timings. When terminal device 100 determines that these timings coincide with the predetermined timings, terminal device 100 shifts the operating mode to a registration mode. In the registration mode, terminal device 100 communicates with master wireless device 300 about the registration.

As described, terminal device 100 according to Embodiment 1 can shift to the registration mode in response to opening and closing of window 52. In other words, terminal device 100 is capable of shifting to the registration mode using the same operation and mechanism as it operates in the normal mode. In addition, master wireless device 300 is not required to inquire the database of the registration information.

1-2. Electrical Configuration

1-2-1. Electrical Configuration of Terminal Device

Figure 2:
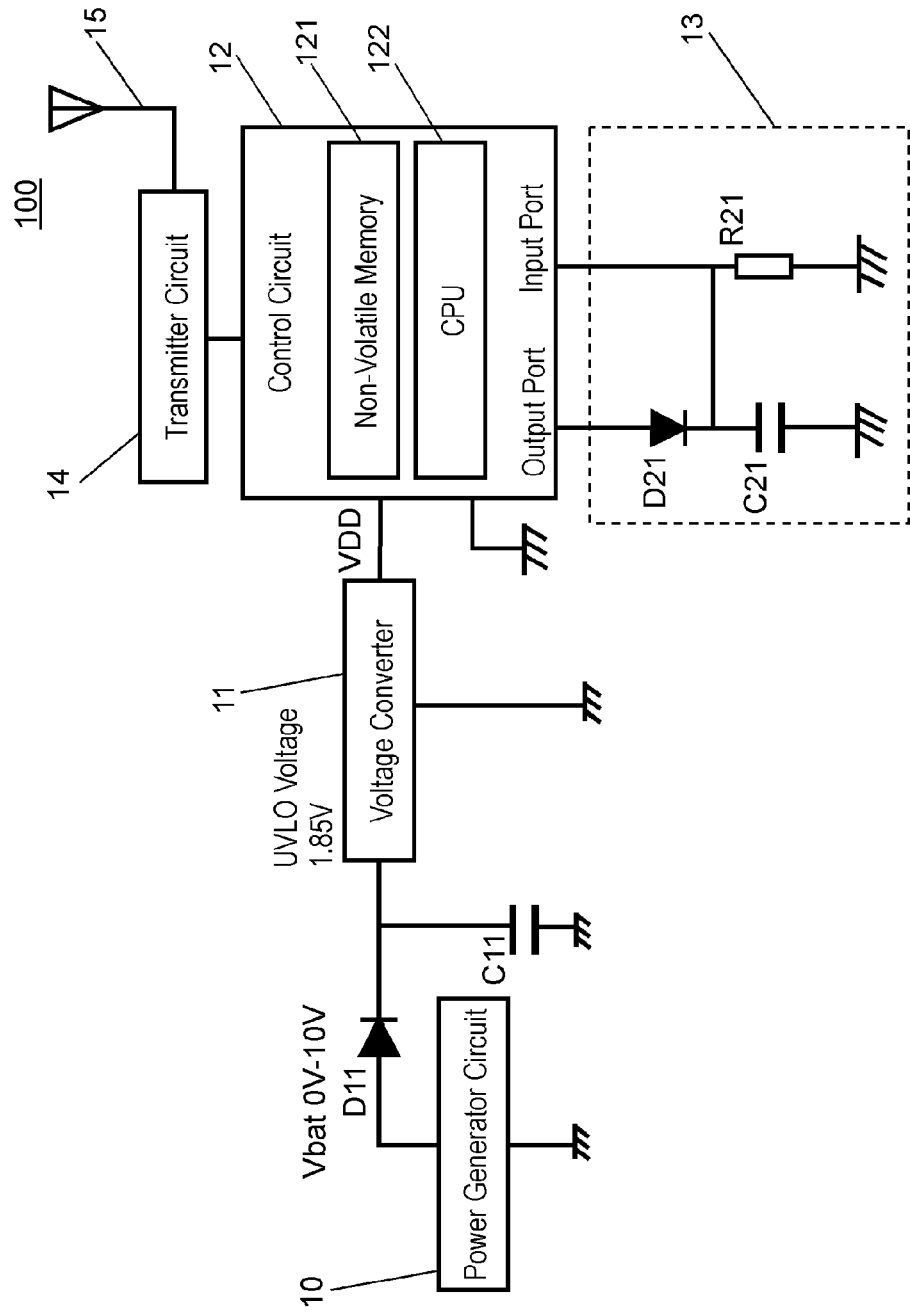
FIG. 2 is a block diagram of a terminal device according to Embodiment 1 for illustrating an electrical configuration thereof.

An electrical configuration of terminal device 100 according to Embodiment 1 will be described with reference to FIG. 2. FIG. 2 is a block diagram of terminal device 100 for illustrating the electrical configuration. Terminal device 100 includes power generator circuit 10, voltage converter 11, control circuit 12, determinator circuit 13, transmitter circuit 14, and antenna 15.

Power generator circuit 10 generates electricity by using energy produced by opening and closing of window 52. Electric power Vbat obtained from power generator circuit 10 is supplied to control circuit 12 and transmitter circuit 14 of terminal device 100. The electric power Vbat has a voltage ranging from about 0V to about 10V. The electric power Vbat is rectified by diode D11, stored once in capacitor C11 for charging the electricity, and input to voltage converter 11.

Voltage converter 11 converts the voltage of electric power Vbat. Voltage converter 11 has an under-voltage lockout (UVLO) function to prevent malfunctions. According to Embodiment 1, an UVLO voltage as a threshold is 1.85V. Any voltage higher than 1.85V is converted to 1.8V by voltage converter 11, and supplied to control circuit 12 as power-supply voltage VDD. A waveform of power-supply voltage VDD becomes a pulse shape since the electric power Vbat is generated by power generator circuit 10 each time window 52 is opened or closed.

Control circuit 12 outputs a variety of signals in response to power-supply voltage VDD input thereto. Operating modes: a normal mode and a registration mode are set to control circuit 12. When power-supply voltage VDD is input to control circuit 12 in the normal mode, control circuit 12 outputs startup information, such as an identifier of terminal device 100, relating to startup of terminal device 100 and data relating to opening and closing of window 52. The data relating to opening and closing of window 52 is encrypted for security. The encrypted data is hereafter referred to as encrypted data. On the other hand, when power-supply voltage VDD is input to control circuit 12 in the registration mode, control circuit 12 outputs registration information, such as the identifier of terminal device 100, relating to registration of terminal device 100 with master wireless device 300 and an encryption key to decrypt the encrypted data. Control circuit 12 includes non-volatile memory 121, and central processing unit (CPU) 122. The identifier and the encryption key are stored in non-volatile memory 121. Central processing unit 122 performs various functions, such as numerical calculation, information processing, and control of circuits.

Determinator circuit 13 determines whether or not a predetermined time elapses from a preceding startup of terminal device 100 to a next startup of terminal device 100, and is used to determine whether or not the operating mode of control circuit 12 is shifted from the normal mode to the registration mode. Determinator circuit 13 is a time constant circuit that includes diode D21, resistor R21, and capacitor C21. The capacitance of capacitor C21 is 1 µF, and the resistance of resistor R21 is 1 MΩ according to Embodiment 1. Time constant τ of determinator circuit 13 is 1 second. A voltage input to determinator circuit 13 from an output port of control circuit 12 decreases according to the time constant τ. An output voltage that decreases in determinator circuit 13 can be detected at an input port of control circuit 12. A time interval from the preceding startup of terminal device 100 to the next startup of terminal device 100, that is, the interval from the last opening or closing of window 52 to the next opening or closing of window 52 by user 51 can be detected based on output values of determinator circuit 13. The operation in which control circuit 12 shifts from the normal mode to the registration mode based on the outputs of determinator circuit 13 will be detailed later an item of registration method.

Transmitter circuit 14 transmits signals output from control circuit 12 to master wireless device 300 via antenna 15. Transmitter circuit 14 transmits the signals containing, e.g. the startup information and the registration information by using the electric power obtained from generator circuit 10.

1-2-2. Electrical Configuration of Master Wireless Device

Figure 3:
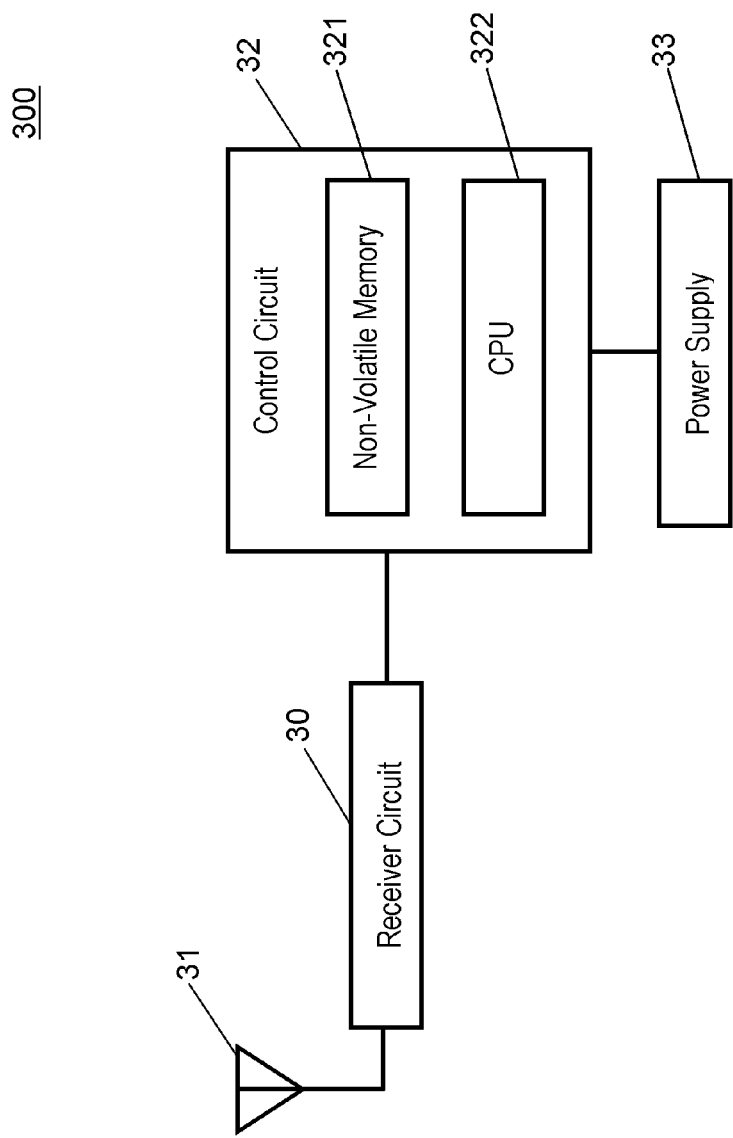
FIG. 3 is a block diagram of a master wireless device according to Embodiment 1 for illustrating an electrical configuration thereof.

An electrical configuration of master wireless device 300 according to Embodiment 1 will be described with referring to FIG. 3. Master wireless device 300 includes receiver circuit 30, antenna 31, control circuit 32, and power supply 33. Control circuit 32 includes non-volatile memory 321, and central processing unit 322.

Receiver circuit 30 receives signals transmitted from terminal device 100 via antenna 31.

Control circuit 32 performs tasks, such as the decrypting of the encrypted data received by receiver circuit 30 and the registration of terminal device 100 by using central processing unit 322. Non-volatile memory 321 stores the identifier and the encryption key of terminal device 100.

Power supply 33 supplies electric power to receiver circuit 30, control circuit 32, and the like components. Power supply 33 is connected with an external power source.

1-3. Registration Method

Figure 4:
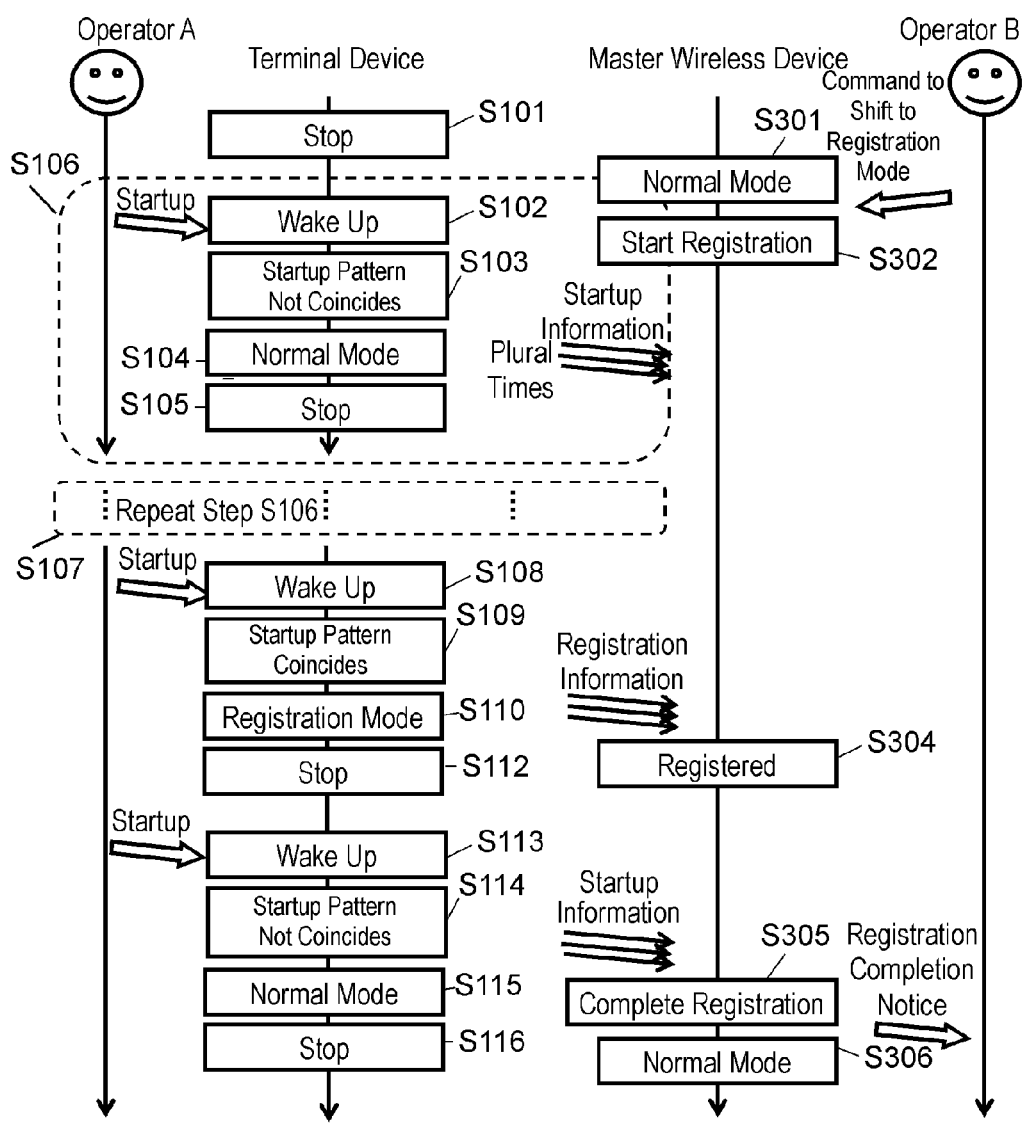
FIG. 4 is a sequence diagram of the wireless communication system according to Embodiment 1 for illustrating a registration method thereof.
Figure 5:
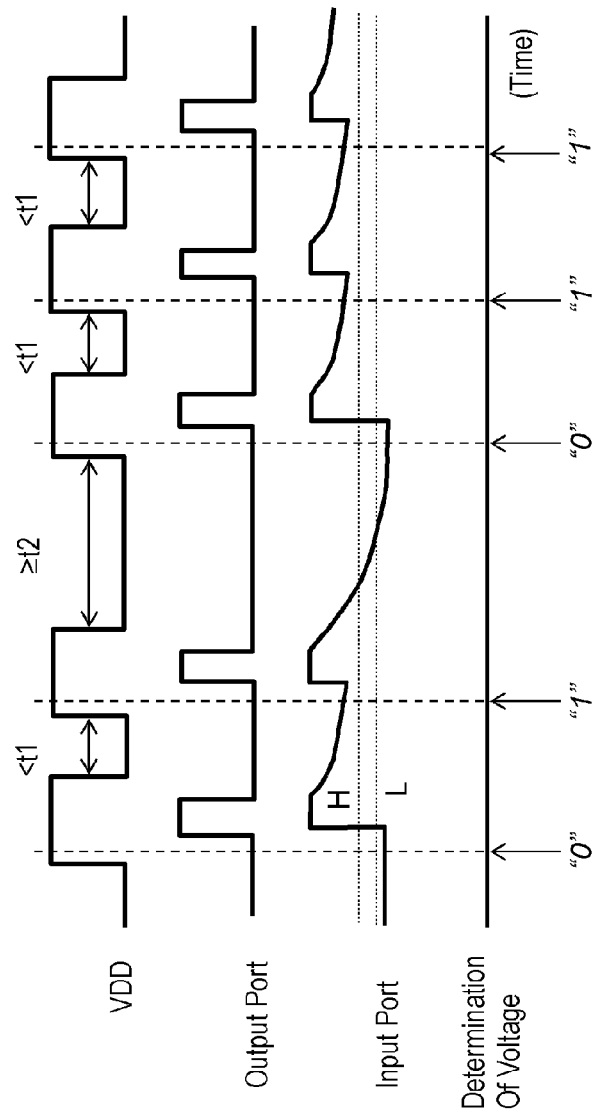
FIG. 5 is a timing chart of an operation of a control circuit of the terminal device according to Embodiment 1 shifting to a registration mode.

Referring to FIG. 4 and FIG. 5, the registration method of terminal device 100 and master wireless device 300 will be described below. FIG. 4 is a sequence diagram showing the registration method while FIG. 5 is a timing chart when operation of control circuit 12 of terminal device 100 shifts to the registration mode. Both operators A and B shown in FIG. 4 are construction workers of the window where terminal device 100 and master wireless devices 300 are installed. The operator A may be different from the operator B, or may be identical to the operator B.

Terminal device 100 operates intermittently, as shown in FIG. 4. According to Embodiment 1, electricity is generated by terminal device 100 in itself only when window 52 is opened or closed. This electric power is supplied to terminal device 100. Terminal device 100 starts up simultaneously to the supplying of the electric power and operates only for a predetermined time after the startup, that is, for the predetermined time after the opening or closing of window 52. Terminal device 100 then stops after operating for the predetermined time as the electric power is used up completely (S101).

On the other hand, master wireless device 300 continuously operates any time since master wireless device 300 is connected to the external supply source. An operating mode of master wireless device 300 under normal conditions is a normal mode for receiving startup information from terminal device 100 (S301). When the operator B operates master wireless device 300 and provides a command of shifting to a registration mode, master wireless device 300 starts a registration process (S302).

While terminal device 100 stops (S101), the operator A opens or closes window 52. This causes terminal device 100 to generate electricity, and to start up, i.e., wake up (S102). Upon starting up, terminal device 100 determines whether or not timing of the startup coincides with a predetermined timing pattern for shifting to the registration mode. If it is not determined that the timing of the startup coincides with the predetermined timing pattern (S103), the operating mode is shifted to the normal mode (S104). In addition, terminal device 100 stores information of the startup timing in non-volatile memory 121. After that, terminal device 100 transmits startup information including an identifier of terminal device 100 and encrypted data relating to the opening or closing of window 52 to master wireless device 300. According to Embodiment 1, the identifier and the encrypted data are transmitted repetitively plural timed per each startup in order to improve reliability of the transmission. However, the transmission may transmit them only once per each startup. When the transmission is completed and the electric power is used up completely, terminal device 100 stops again (S105).

When operator A intends to shift the operating mode of control circuit 12 of terminal device 100 from the normal mode to the registration mode, the operator A opens and closes window 52 plural times at a predetermined timing pattern. According to Embodiment 1, window 52 is opened and closed five times such that window 52 is opened, closed, opened, closed, and again opened, for example. At this moment, a time interval between the second and the third opening-and-closing operation is not shorter than t2 (seconds) whereas other time intervals are shorter than t1 (seconds). Then, terminal device 100 starts up according to a timing pattern corresponding to the timing pattern of opening and closing of window 52 five times. Terminal device 100 starts up every time window 52 is opened or closed, and repeats a combination of steps S102 to S105 (5106) described above (S107). In addition, information of the individual startup timings is stored in non-volatile memory 121.

According to Embodiment 1, the step S102 corresponds to the first startup, the step S107 corresponds to processes involving the second to fourth startups, and the step S108 corresponds to the fifth startup.

Upon determining in step S109 that the timing pattern of the five startups stored in non-volatile memory 121 coincide with a predetermined timing pattern, control circuit 12 of terminal device 100 shifts to the registration mode (S110). This determination of the timing patterns will be described later with referring to FIG. 5.

In the registration mode, terminal device 100 outputs registration information relating to registration with master wireless device 300, that is, the identifier and the encryption key, and transmits the identifier and the encryption key to master wireless device 300. Upon completing transmitting the identifier and the encryption key, terminal device 100 resets the timing patterns stored in non-volatile memory 121. Terminal device 100 then stops again (S112).

On the other hand, when master wireless device 300 receives the identifier and the encryption key, i.e., the registration information, from terminal device 100 while having started the registration process, master wireless device 300 stores the identifier and the encryption key in non-volatile memory 321 of master wireless device 300. This is to complete the registration with master wireless device 300 (S304).

Finally, the operator A confirms that the registration has been made correctly. The operator A open or closes operation of window 52 just once to start up terminal device 100 again (S113). Terminal device 100 determines a timing pattern of the startup. Terminal device 100 determines that the timing pattern of the startup does not coincide with the predetermined timing pattern (S114), terminal device 100 shifts to the normal mode (S115). Terminal device 100 then transmits startup information, that is, the identifier and the encrypted data to master wireless device 300, and then, stops (S116).

Master wireless device 300 receives the identifier and the encrypted data from terminal device 100. When master wireless device 300 can correctly decrypt the received encrypted data, the registration of terminal device 100 with master wireless device 300 is completed (S305). Master wireless device 300, upon completion of the registration, outputs registration completion notification to the operator B, and returns to the normal mode (S306). The registration completion notification is to notify the operator B of the completion of the registration. The registration completion notification can be a signal, such as a sound and light, or may be a message, such as a mail, transmitted to a predesignated address.

The registration of the wireless communication system is executed by communications established between terminal device 100 and master wireless device 300. Once the registration is completed between terminal device 100 and master wireless device 300, terminal device 100 and master wireless device 300 can communicate with each other. In other words, terminal device 100 transmits the startup information thereof to master wireless device 300 every time user 51 opens or closes window 52, so that master wireless device 300 can receive and decrypt the startup information. Thus user 51 can obtain information about opening and closing of window 52 through the notification from master wireless device 300 or by accessing master wireless device 300.

A method for determining whether a timing of opening and closing window 52 coincides with the predetermined timing will be detailed below with referring to FIG. 5.

FIG. 5 is a timing chart of control circuit 12 when operator A opens and closes windows 52 five times as described above. The time interval between the second and the third opening-and-closing actions is not shorter than time t2 (seconds) while other time intervals are shorter than time t1 (seconds), as described above.

Control circuit 12 receives a pulse voltage of power-supply voltage VDD every time window 52 is opened or closed. The pulse voltage corresponding to power-supply voltage VDD is supplied to determinator circuit 13 through the output port. An output voltage from determinator circuit 13 is input to the input port of control circuit 12. The voltage input to the input port decreases according to the above-stated time constant τ of determinator circuit 13. When a waveform of power-supply voltage VDD rises, control circuit 12 compares the voltage at the input port with predetermined reference values. The reference values are previously determined as two values of high (H) and low (L). By comparing the voltage at the input port with the two reference values, control circuit 12 can obtain a time interval from the preceding startup to the next startup of terminal device 100. According to Embodiment 1, control circuit 12 determines that the time interval from the preceding startup to the next startup is shorter than time t1 (seconds) when a voltage read at the input port is higher than the reference value (H), and outputs digit "1". When the voltage reading at the input port is lower than the reference value (L), on the other hand, control circuit 12 determines that the time interval from the preceding startup to the next startup is not shorter than time t2 (seconds), and outputs digit "0". Therefore, control circuit 12 outputs digits of "0", "1", "0", "1" and "1" in the instance of the startup timings according to Embodiment 1.

Control circuit 12 compares this output pattern with the output pattern previously stored in non-volatile memory 121, and shifts the operating mode to the registration mode when the output patterns coincide with each other. If the output patterns do not coincide with each other, control circuit 12 keeps the operating mode to remain in the normal mode. Control circuit 12 of terminal device 100 shifts from the normal mode to the registration mode as described above based on the timings of the plural startups of terminal device 100.

1-4. Beneficial Effects

According to Embodiment 1, the operating mode can be shifted to the registration mode by the operation of opening and closing window 52 similarly to terminal device 100 in the normal mode. Therefore, terminal device 100 does not require a mechanism, such as a switch, for switching the operating mode to shift to the registration mode. In addition, it is not necessary for the user to push any switch to shift to the registration mode. Therefore, the user can easily shift terminal device 100 to the registration mode even in a case of energy-harvesting wireless device that is often built inside a building fixture or disposed in an area not easily accessible to the user. Moreover, master wireless device 300 is not required to inquire the database of the registration information. The wireless communication system can therefore complete the registration operation. In addition, the wireless communication system can reduce the time required to register since it is not necessary to inquire the database. Moreover, the system itself can be simplified. This can hence reduce the work necessary for construction of the system, control and management of the data.

Although terminal device 100 of the first embodiment is suitable for such terminal device 100 that is equipped with power generator circuit 10, it is also applicable to terminal device 100 not equipped with power generator circuit 10 but with a battery.

According to Embodiment 1, the expression of "opening and closing" of window 52 means at least one of "opening" and "closing" of windows 52, but it may also mean "opening and closing".

Moreover, according to Embodiment 1, "plural" in the expression of "timings of plural startups" indicates five times, it can be any number of times without limiting it to five times. However, it is preferably three or more times so as to reduce a malfunction.

Furthermore, according to Embodiment 1, the normal mode and the registration mode are shown as the operating modes of control circuit 12, but may be altered to be settable to other operating modes. For example, it may be changed to become settable to a rest mode in which no signal is output even when terminal device 100 starts up. Terminal device 100 is configured to shift directly from the normal mode to the registration mode in the step S110 shown in FIG. 4, but may be altered such that it once goes into another operating mode, such as a rest mode, and then, shifts from the rest mode to the registration mode when it determines that the startup pattern coincides in the step S109.

According to Embodiment 1, terminal device 100 is started once again in the step S113 after the registration of the step S304 for confirmation of the registration, but this process may be omitted. That is, the process of registration can be completed after the registration step S304 without the confirming of the registration.

Moreover, according to Embodiment 1, terminal device 100 is mounted inside window frame 50. However, the location of installation is not restricted by this embodiment. Terminal device 100 can be installed in any other place, such as a surface of window frame 50 and inside of a glass window.

According to Embodiment 1, the wireless communication system is used for detecting opening and closing of window 52, it can also be used for other applications. Such other applications include detection of whether or not a light, an air conditioner, or an electrical appliance is operated, a door is opened and closed, and a window or a door is locked, as a few examples. Terminal device 100 can be disposed in a switch, a door, a key lever, or a doorknob according to any particular application of the wireless communication system. Terminal device 100 is only required to generate electricity in response to on-and-off shifting of the switch, opening and closing of the door, and the rotation or displacement of the lever or the doorknob, and to start up. Moreover, this wireless communication system can be used to collect biomedical information, such as pulses and blinks of an eye, of a human or an animal. In this case, terminal device 100 is disposed on a body adjacent to a blood vessel or an eyelid of the human or the animal. Terminal device 100 hence generates electricity, and starts up according to movement of the living body.

2. Exemplary Embodiment 2

Figure 6:
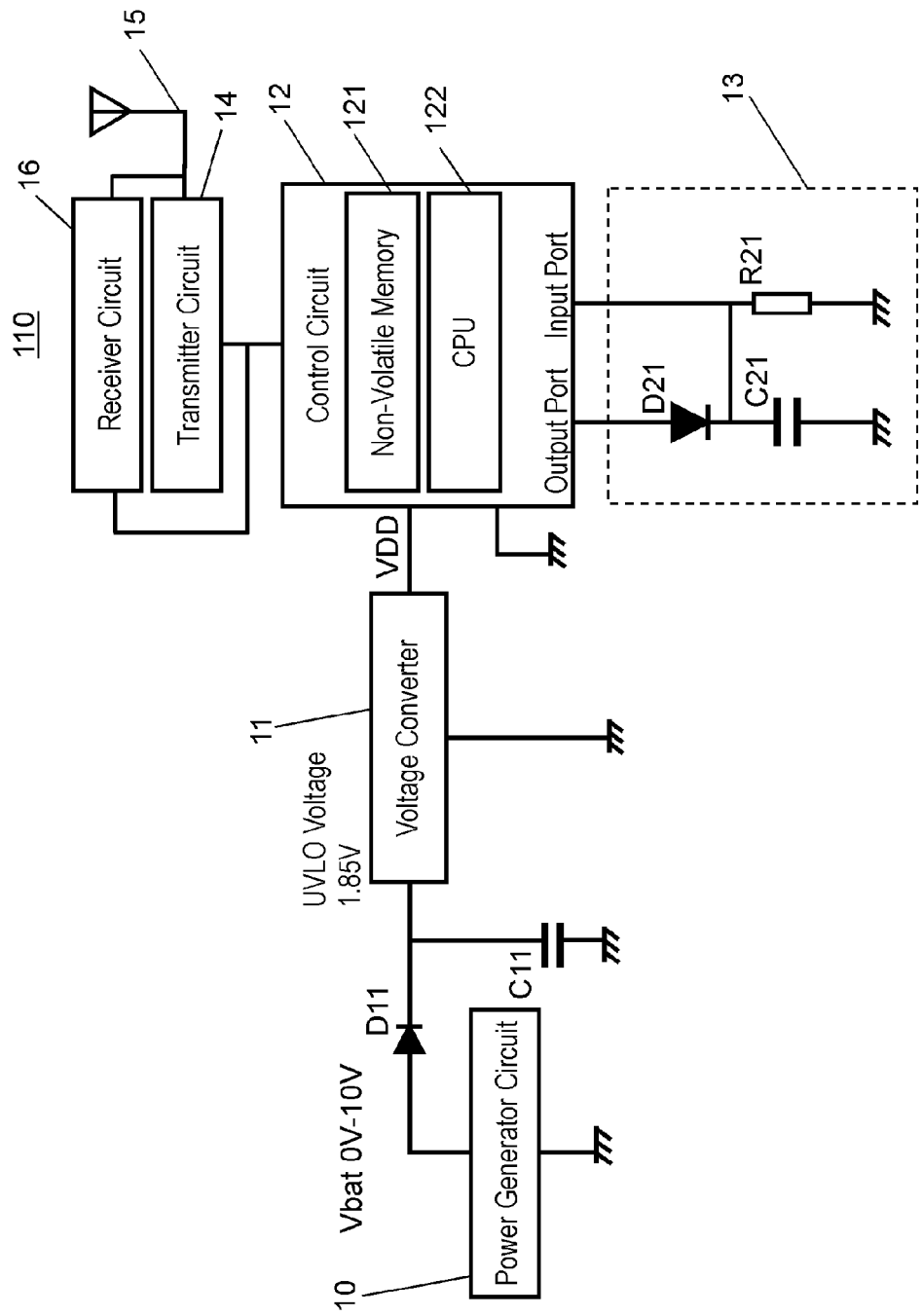
FIG. 6 is a block diagram of a terminal device according to Exemplary Embodiment 2 for illustrating an electrical configuration thereof.

A wireless communication system according to Exemplary Embodiment 2 will be described with referring to FIGS. 6 to 8. The operation of terminal device 110 until the shifting to a registration mode is identical to both wireless communication systems according to Embodiment 1 and Embodiment 2. But, a registration method between terminal device 110 and master wireless device 310 is different after shifting of terminal device 110 to the registration mode. To simplify the description components common to both Embodiment 2 and Embodiment 1 are denoted by the same reference numerals.

2-1. Electrical Configuration 2-1-1. Electrical Configuration of Terminal Device FIG. 6 shows an electrical configuration of terminal device 110 according to Embodiment 2. Terminal device 110 includes receiver circuit 16. Similar to terminal device 100 according to Embodiment 1, terminal device 110 includes power generator circuit 10, voltage converter 11, control circuit 12, determinator circuit 13, transmitter circuit 14, and antenna 15.

Receiver circuit 16 receives a signal from master wireless device 310 through antenna 15. According to Embodiment 2, the signal from master wireless device 310 refers to an identifier and an encryption key of terminal device 110.

2-1-2. Electrical Configuration of Master Wireless Device

Figure 7:
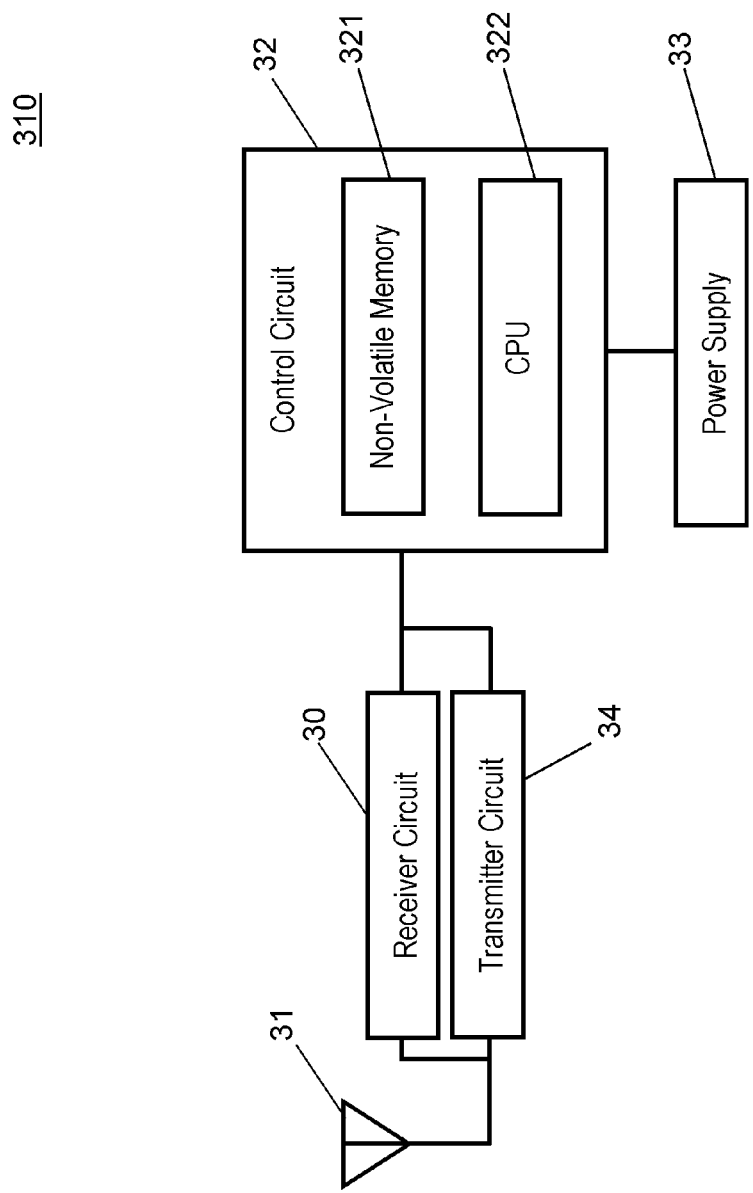
FIG. 7 is a block diagram of a master wireless device according to Embodiment 2 for illustrating an electrical configuration thereof.

FIG. 7 shows an electrical configuration of master wireless device 310 according to Embodiment 2. Master wireless device 310 includes transmitter circuit 34. Master wireless device 310 further includes receiver circuit 30, antenna 31, control circuit 32, and power supply 33, similar to master wireless device 300 according to Embodiment 1.

Transmitter circuit 34 transmits a signal to terminal device 110 through antenna 31.

2-2. Registration Method

Figure 8:
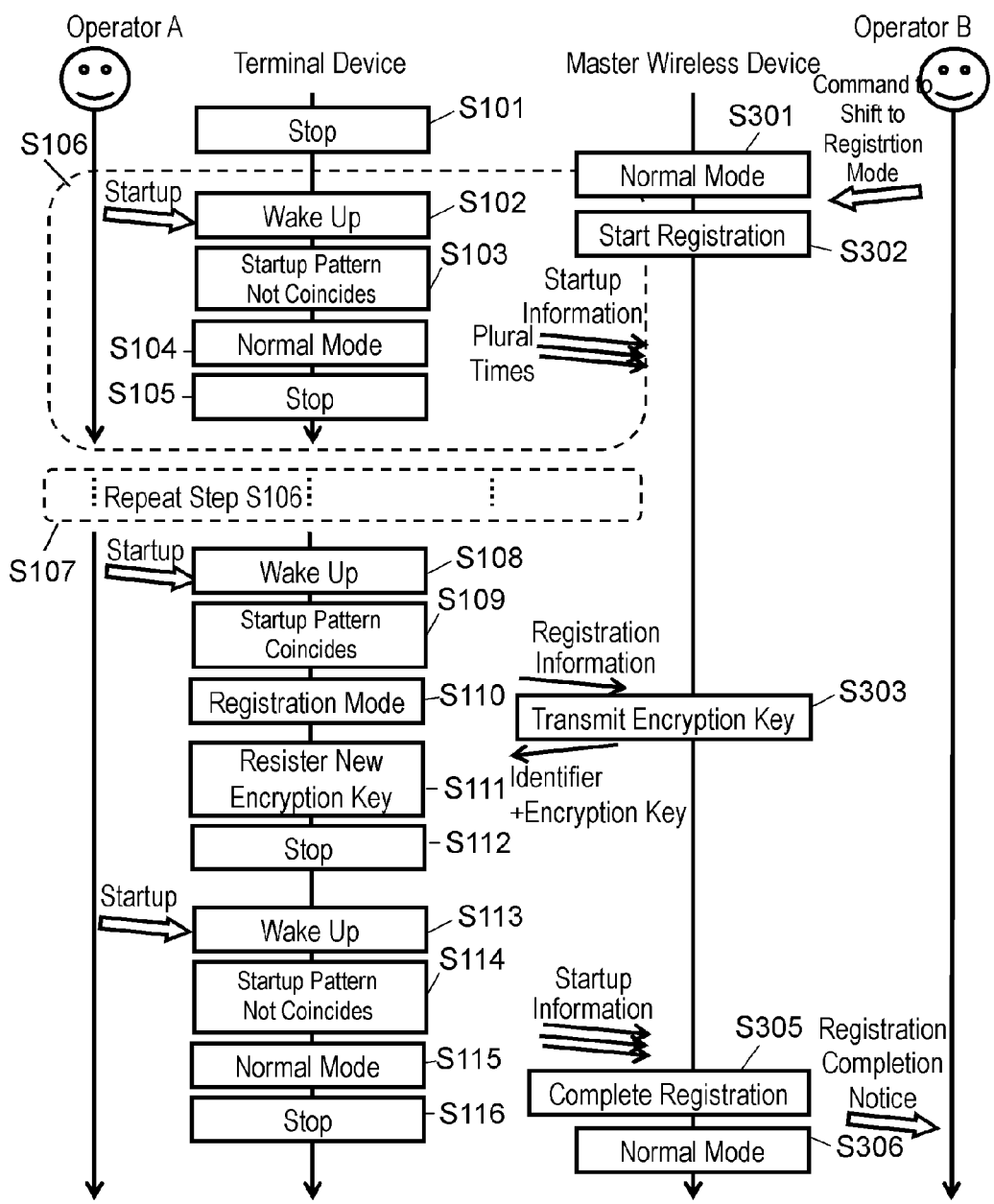
FIG. 8 is a sequence diagram of a wireless communication system according to Embodiment 2 for illustrating a registration method thereof.

FIG. 8 is a sequence diagram showing the registration method of the wireless communication system according to Embodiment 2.

Terminal device 110 shifts to the registration mode in step S110 similarly to Embodiment 1. According to Embodiment 2, terminal device 110, upon shifting to the registration mode, and transmits an identifier of terminal device 110 and a registration request signal to master wireless device 310 as registration information. The registration request signal is a signal for requesting master wireless device 310 to transmit an encryption key. The encryption key is used to encrypt data relating to opening and closing of a window. According to Embodiment 2, the encryption key transmitted from master wireless device 310 is changed every time the registration is made.

When master wireless device 310, in a state of being ready for registration (S302), receives a registration request signal from terminal device 110, master wireless device 310 transmits to terminal device 110 the identifier and the encryption key of terminal device 110 (S303).

Terminal device 110 stores the encryption key transmitted from master wireless device 310 in non-volatile memory 121 (S111). If another encryption key is transmitted from master wireless device 310 and stored previously, it is replaced with the new encryption key. The registration with terminal device 110 is completed when the new encryption key is stored in non-volatile memory 121. Terminal device 110 then resets previous timing pattern stored in non-volatile memory 121, and stops again (S112).

Finally, operator A confirms whether or not the registration is correctly made, similarly to Embodiment 1. When the operator A opens or closes window 52 just once, terminal device 110 starts up (S113). Terminal device 110 determines a timing pattern of the startup. When terminal device 110 determines that the timing pattern does not coincide with a predetermined timing pattern (S114), terminal device 110 shifts the operating mode to a normal mode (S115). In the normal mode, terminal device 110 transmits startup information, that is, the identifier and an encrypted data to master wireless device 310. This encrypted data is encrypted by a new encryption key stored in the step S111. Master wireless device 310 receives the startup information, and decrypts the received encrypted data by the above-stated new encryption key. When master wireless device 310 can decrypt the encrypted data correctly, the registration of terminal device 110 with master wireless device 310 is completed (S305). Master wireless device 310 then sends a registration completion notification to the operator B, and goes back to the normal mode (S306).

Once the registration is completed between terminal device 110 and master wireless device 310, terminal device 110 transmits data encrypted by the above-stated new encryption key to master wireless device 310 together with an identifier of terminal device 110 when user 51 opens or closes window 52 again. Master wireless device 310 then decrypts the encrypted data by using the encryption key, so that it can notify user 51 of the information.

2-3. Beneficial Effects

According to Embodiment 2, the encryption key can be updated each time the encryption key is transmitted from master wireless device 310. Therefore, the level of security can be improved substantially. It is hence useful for such applications that a resident of the room is changed, and only master wireless device 310 is replaced with a new model, for example.

In the case where terminal device 110 can ensure generation of sufficient power, it can be adapted to use a generally known public key cryptosystem. In this case, master wireless device 310 transmits a public key as an encryption key in the step S303. Terminal device 110 stores the public key in the step S111, and transmits data encrypted by the public key as startup information to master wireless device 310 in the step S115. Master wireless device 310, on the other hand, decrypts the encrypted data by using a private key that is stored only in non-volatile memory 321 of master wireless device 310. The use of this public key cryptosystem can further decrease the possibility that the encrypted data is read by third parties.

According to Embodiment 2, master wireless device 310 transmits a different encryption key at each time to terminal device 110, but may instead transmit any encryption key selected at random from plural encryption keys, for instance. Or, the same encryption key may be used several times before changing it to another one, instead of changing the encryption key every time. The encryption key transmitted from master wireless device 310 to terminal device 110 is new and different from the previous encryption key transmitted from master wireless device 310 before this key is transmitted, and for this reason the security can be tightened. It is nevertheless possible to make registration even if the same encryption key is used at all times.

Furthermore, master wireless device 310 sets the encryption key automatically according to Embodiment 2, but may be altered so that the operator B chooses a desired key.

Moreover, confirmation of the registration is made before completion of the registration in the step S305, but this process may also be omitted according to Embodiment 2.

According to Embodiment 2, similarly to Embodiment 1, the operating mode of terminal device 110 can be shifted to the registration mode by the operation of opening and closing window 52 similar to operations in the normal mode. In addition, it is not necessary for master wireless device 310 to inquire the database.

2-4. Modification

Transmission power of terminal device 110 to transmit registration information to master wireless device 310 may be equal to transmission power of master wireless device 310 to transmit the encryption key to terminal device 110. However, the transmission power of master wireless device 310 to transmit the encryption key can be larger than the transmission power of terminal device 110 to transmit the registration information. Here, master wireless device 310 has an enough amount of usable electric power since it is connected to an external supply source. It is therefore easier to increase the transmission power of master wireless device 310 than to increase the transmission power of terminal device 110. Terminal device 110 can receive a signal from master wireless device 310 more reliably by increasing the transmission power of master wireless device 310 to transmit the encryption key even when an antenna gain of terminal device 110 is smaller than an antenna gain of master wireless device 310.

In addition, a communication frequency used by terminal device 110 to transmit the registration information to master wireless device 310 may be different from a communication frequency used by master wireless device 310 to transmit the encryption key to terminal device 110. An example in which the wireless communication system is used in Japan will be described below. Terminal device 110 is adapted to use a frequency band between 928.15 MHz and 929.65 MHz, in which a maximum power allowed by the law is relatively smaller as 1 mW, for transmitting the registration information. On the other hand, master wireless device 310 is adapted to use another frequency band between 923.6 MHz and 928.0 MHz, in which the allowable maximum power is relatively larger as 20 mW, for transmitting the encryption key to terminal device 110. As a result, master wireless device 310 can execute the transmission with a large power.

Description of configurations similar to those of the first embodiment and their effects is skipped.

3. Exemplary Embodiment 3

A wireless communication system according to Exemplary Embodiment 3 will be described below with referring to FIG. 9 to FIG. 11. Terminal device 120 according to Embodiment 3 has an electrical configuration different in part from that of Embodiment 1. In terminal device 120 according to Embodiment 3, electric power having a voltage below the UVLO voltage that has been wasted in the first embodiment is supplied to determinator circuit 13. An electrical configuration of master wireless device 300 according to Embodiment 3 is identical to that of Embodiment 1. To simplify the description, components that are common to both Embodiment 3 and Embodiment 1 are denoted by the same reference numerals.

3-1. Electrical Configuration of Terminal Device

Figure 9:
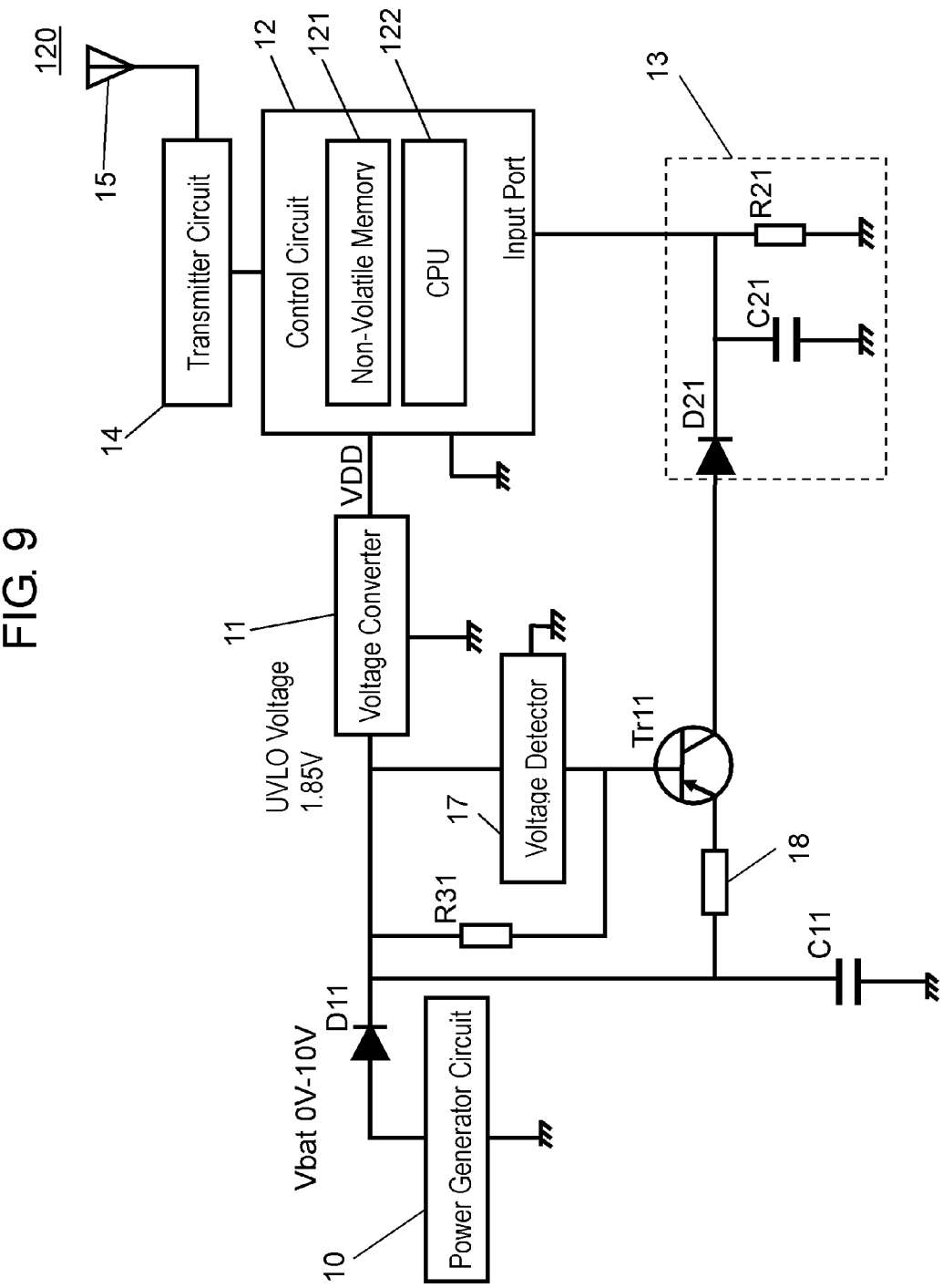
FIG. 9 is a block diagram of a terminal device according to Exemplary Embodiment 3 for illustrating an electrical configuration thereof.

FIG. 9 shows an electrical configuration of terminal device 120 of the third embodiment. Terminal device 120 includes voltage detector 17, and transistor Tr11 functioning as a switch. Similar to terminal device 100 according to Embodiment 1, terminal device 120 also includes power generator circuit 10, voltage converter 11, control circuit 12, determinator circuit 13, transmitter circuit 14, and antenna 15.

Voltage detector 17 has an output impedance changing when a voltage becomes not higher than a predetermined value. According to Embodiment 3, the impedance becomes high at voltages exceeding the UVLO voltage, i.e., voltages higher than 1.85V, and the impedance becomes low at voltages equal to or below the UVLO voltage.

Figure 10:
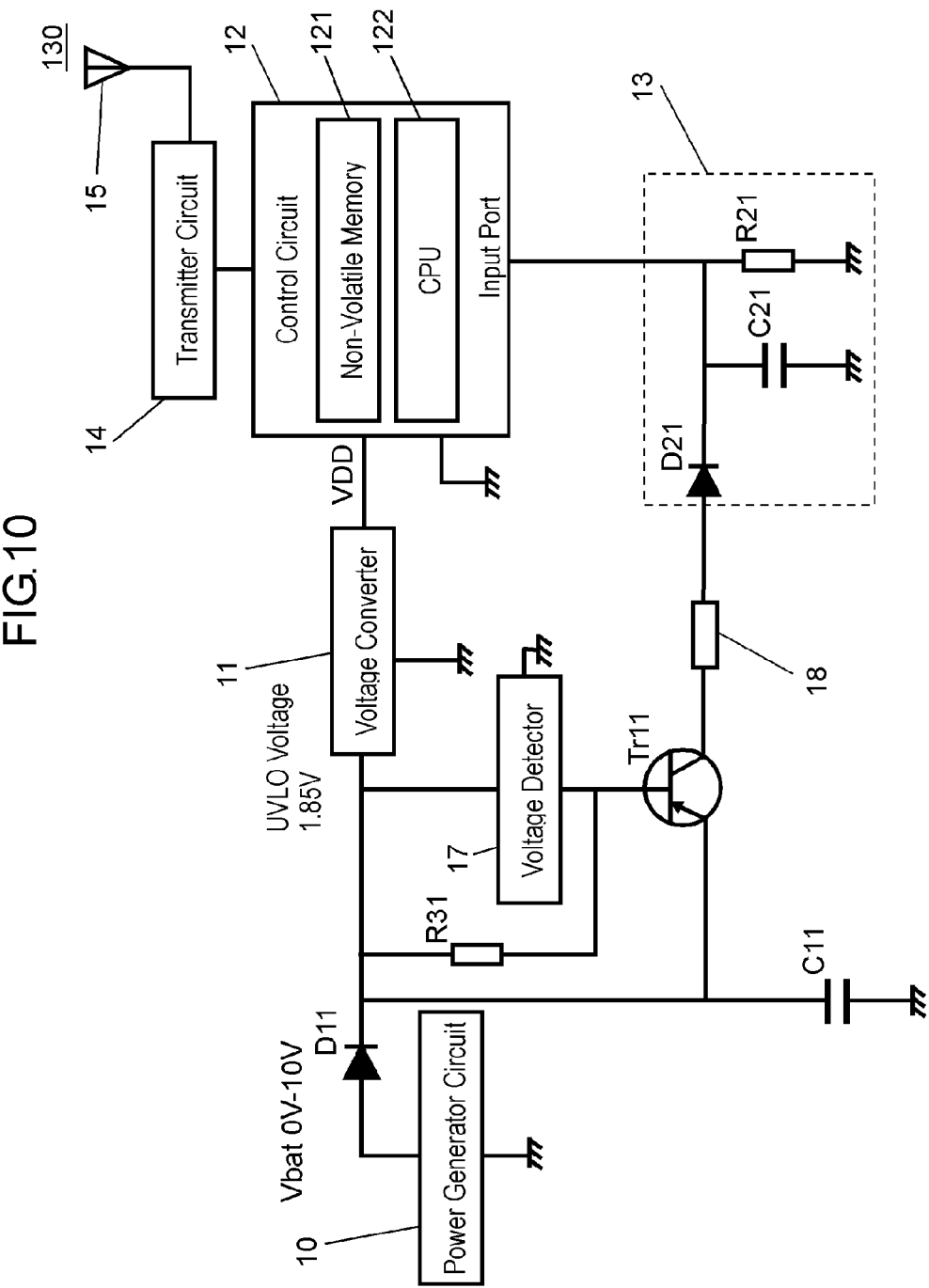
FIG. 10 is a block diagram of another terminal device according to Embodiment 3 for illustrating an electrical configuration thereof.

The switch according to Embodiment 3 is implemented by transistor Tr11 of FIG. 10. Transistor Tr11 is used to supply electric charge of any voltage not higher than the UVLO voltage to determinator circuit 13. The base of transistor Tr11 is connected with an output side of voltage detector 17. Transistor Tr11 is turned on when the output impedance of voltage detector 17 changes to a low impedance. On the other hand, transistor Tr11 is turned off when the output impedance of voltage detector 17 changes to a high impedance. Transistor Tr11 is provided between capacitor C11 storing the electric power obtained from power generator circuit 10 and capacitor C21 that constitutes determinator circuit 13. Resistor R31 is provided as a bias resistor of transistor Tr11 between an input side of voltage converter 11 and the base of transistor Tr11. This configuration can stabilize the base voltage of transistor Tr11. By having voltage detector 17 change the output impedance between the low impedance and the high impedance, the voltage can be supplied to transistor Tr11 such that transistor Tr11 is operated as a switch to turn on and off.

According to Embodiment 3, delay line 18 is disposed between capacitor C11 and transistor Tr11. Delay line 18 is implemented by any of a resistor, a coil, a semiconductor device, and the like components. Transistor Tr11 may be turned on and electric charge is supplied to capacitor C21 of determinator circuit 13 immediately after generation of electricity due to a slight delay for voltage detector 17 to detect a voltage. To cope with such situations, delay line 18 according to Embodiment 1 can prevent the electric charge from being supplied to determinator circuit 13 immediately after generation of the electricity. FIG. 10 shows another electrical configuration of terminal device 130 according to Embodiment 3. As shown in FIG. 10, delay line 18 can be provided between transistor Tr11 and capacitor 21. Terminal device 130 and terminal device 120 are identical in all their configurations other than a difference in positions of delay line 18.

The voltage from power generator circuit 10 is supplied to determinator circuit 13 according to Embodiment 3 not via control circuit 12. In other words, a part of the electric power provided by power generator circuit 10 is supplied to determinator circuit 13 directly rather than via control circuit 12. An output of determinator circuit 13 can be read at the input port of control circuit 12 similarly to Embodiment 1.

3-2. Operation of Terminal Device for Registration

FIG. 11 is a timing chart when terminal device 120 shifts operation to a registration mode.

Power generator circuit 10 generates electric power Vbat whenever window 52 is opened or closed. Voltage converter 11 disregards a low voltage not higher than of 1.85V by the UVLO function, so that power-supply voltage VDD can be a pulse shape shown in FIG. 11. Output impedance of voltage detector 17 becomes high at voltages higher than 1.85V and not higher than 1.85V. Transistor Tr11 is turned off (OFF) when the output impedance of voltage detector 17 becomes high. Transistor Tr11 is turned on (ON) when the output impedance becomes low. When transistor Tr11 is turned on, a voltage is supplied to determinator circuit 13. This voltage decreases according to time constant τ, and the voltage is read at the input port.

Control circuit 12 reads the output of determinator circuit 13 when a waveform of power-supply voltage VDD rises, similarly to control circuit 12 according to Embodiment 1. Control circuit 12 then outputs digit "1" when a voltage value read is not lower than a predetermined high level (H). On the other hand, control circuit 12 outputs digit "0" when the voltage value read is not higher than a predetermined low level (L). Subsequently, control circuit 12 switches the operating mode to a registration mode when an output pattern for plural times coincides with a predetermined output pattern. As described, control circuit 12 of terminal device 120, after it starts up, shifts from the normal mode to the registration mode based on the plural startup timings.

3-3. Beneficial Effects

According to Embodiment 3, the electric charge conventionally disregarded can be supplied to determinator circuit 13, and the energy can be used efficiently. Hence, the electric power can be supplied sufficiently to control circuit 12 and transmitter circuit 14.

In addition, delay line 18 can stabilize an output value of determinator circuit 13, and control circuit 12 reads the output of determinator circuit 13 accurately.

Description of configurations similar to those of the first embodiment and their effects is skipped.

INDUSTRIAL APPLICABILITY

The terminal devices according to Embodiments 1 to 3 are capable of shifting operating mode to a registration mode using the same operation and mechanism as the normal mode. The terminal devices are therefore applicable to wireless communication systems, such as so-called energy-harvesting wireless communication.

REFERENCE MARKS IN THE DRAWINGS

100, 110, 120, 130 terminal device
300, 310 master wireless device
50 window frame
51 user
52 window
10 power generator circuit
11 voltage converter
12 control circuit
121 non-volatile memory
122 central processing unit
13 determinator circuit
14 transmitter circuit
15 antenna
16 receiver circuit
17 voltage detector
30 receiver circuit
31 antenna
32 control circuit
321 non-volatile memory
322 central processing unit
33 power supply
34 transmitter circuit

What is claimed is:

1. A terminal device capable of communicating with a master wireless device, the terminal device comprising a power generator and a control circuit,
   wherein the power generator is configured to generate electric power by energy-harvesting, utilizing energy generated by movement of the terminal device and supply a power-supply voltage based on the electric power to the control circuit, wherein the control circuit has operating modes including a normal operating mode for outputting startup information relating to startup of the terminal device, and a registration mode for outputting registration information relating to registration of the terminal device with the master wireless device,
   wherein the control circuit shifts one of the operating modes to the registration mode based on timing of a plurality of startups of the terminal device due to the movement of the terminal device, wherein the terminal device obtains information of the timing of the plurality of startups of the terminal device as an output pattern,
   wherein, when a waveform of the power-supply voltage rises, the control circuit obtains a digit composing the output pattern based on a time interval from a preceding startup of the terminal device to a next startup of the terminal device, and
   wherein the control circuit shifts the normal operating mode to the registration mode when the output pattern coincides with a predetermined output pattern and otherwise keeps the operation mode in the normal operating mode.

2. The terminal device according to claim 1, further comprising
   a determinator circuit that determines whether or not a predetermined time elapses from the preceding startup to the next startup of the terminal device,
   wherein the control circuit determines the timing using an output of the determinator circuit.

3. The terminal device according to claim 2,
wherein the determinator circuit includes a time constant circuit changing, according to a predetermined time constant, a voltage corresponding to the electric power generated by the power generator, and inputting the changed voltage to the control circuit, and
wherein the control circuit determines the timing based on the changed voltage input to the control circuit.

4. The terminal device according to claim 3, wherein the voltage corresponding to the electric power generated by the power generator is supplied to the determinator circuit not via the control circuit.

5. The terminal device according to claim 1,
wherein the output pattern is composed of a plurality of digits including the digit, and
wherein the control circuit obtains each of the plurality of digits based on an interval between respective one of pairs of startups out of the plurality of startups of the terminal device.

6. The terminal device according to claim 1,
wherein the terminal device is configured to be mounted to a certain body, and
wherein the power generator is configured to generate electric power in response to a movement of the certain body and supply the electric power to the control circuit.

7. A wireless communication system comprising a master wireless device and a terminal device capable of communicating with the master wireless device,
wherein the terminal device includes a power generator and a control circuit,
wherein the power generator is configured to generate electric power by energy-harvesting, utilizing energy generated by movement of the terminal device and supply a power-supply voltage based on the electric power to the control circuit, wherein the control circuit has operating modes including a normal operating mode for outputting startup information relating to startup of the terminal device, and a registration mode for outputting registration information relating to registration of the terminal device with the master wireless device,
wherein the control circuit shifts one of the operating modes to the registration mode based on timing of a plurality of startups of the terminal device due to the movement of the terminal device, wherein the terminal device obtains information of the timing of the plurality of startups of the terminal device as an output pattern,
wherein the registration information is transmitted to the master wireless device from the terminal device, and received by the master wireless device,
wherein, when a waveform of the power-supply voltage rises, the control circuit obtains a digit composing the output pattern based on a time interval from a preceding startup of the terminal device to a next startup of the terminal device, and
wherein the control circuit shifts the normal operating mode to the registration mode when the output pattern coincides with a predetermined output pattern and otherwise keeps the operation mode in the normal operating mode.

8. The wireless communication system according to claim 7,
wherein, upon receiving the registration information, the master wireless device transmits an encryption key to the terminal device, and
wherein the terminal device receives the encryption key.

9. The wireless communication system according to claim 7, wherein the encryption key transmitted from the master wireless device to the terminal device is different from another encryption key obtained before the encryption key.

10. The wireless communication system according to claim 8, wherein transmission power of the master wireless device for transmitting the encryption key is larger than transmission power of the terminal device for transmitting the registration information.

11. The wireless communication system according to claim 7,
wherein the terminal device further includes a determinator circuit that determines whether or not a predetermined times elapses from the preceding startup to the next startup of the terminal device, and
wherein the control circuit determines the timing using an output of the determinator circuit.

12. The wireless communication system according to claim 11,
wherein the determinator circuit includes a time constant circuit changing, according to a predetermined time constant, a voltage corresponding to the electric power generated by the power generator, and inputting the changed voltage to the control circuit, and
wherein the control circuit determines the timing based on the changed voltage input to the control circuit.

13. The wireless communication system according to claim 12, wherein the voltage corresponding to the electric power generated by the power generator is supplied to the determinator circuit not via the control circuit.

14. The wireless communication system according to claim 7,
wherein the output pattern is composed of a plurality of digits including the digit, and
wherein the control circuit obtains each of the plurality of digits based on an interval between respective one of pairs of startups out of the plurality of startups of the terminal device.

15. The wireless communication system according to claim 7,
wherein the terminal device is configured to be mounted to a certain body, and
wherein the power generator is configured to generate electric power in response to a movement of the certain body and supply the electric power to the control circuit.

16. A wireless communication system comprising a master wireless device and a terminal device capable of communicating with the master wireless device,
wherein the terminal device includes a power generator and a control circuit,
wherein the power generator is configured to generate electric power by energy-harvesting, utilizing energy generated by movement of the terminal device and supply a power-supply voltage based on the electric power to the control circuit,
wherein the control circuit has operating modes including a normal operating mode for outputting startup information relating to startup of the terminal device, and a registration mode for outputting registration information relating to registration of the terminal device with the master wireless device,
wherein the terminal device is configured to:
transmit the registration information to the master wireless device in the registration mode;
shift to the normal operation mode at a startup of the terminal device due to the movement of the terminal device after transmitting the registration information to the master wireless device based on timing of a plurality of startups of the terminal device, wherein the terminal device obtains information of the timing of the plurality of startups of the terminal device as an output pattern, wherein, when a waveform of the power-supply voltage rises, the control circuit obtains a digit composing the output pattern based on a time interval from a preceding startup of the terminal device to a next startup of the terminal device, and wherein the control circuit shifts the normal operating mode to the registration mode when the output pattern coincides with a predetermined output pattern and otherwise keeps the operation mode in the normal operating mode; and transmit the startup information in the normal operating mode shifted at the startup of the terminal device, and wherein, in response to the transmitted startup information, the master wireless device allows the terminal device to be paired with the master wireless device.

17. A master wireless device configured to be used with a terminal device, the master wireless device comprising a receiver circuit, wherein the terminal device includes a power generator and a control circuit, wherein the power generator is configured to generate electric power by energy-harvesting, utilizing energy generated by movement of the terminal device and supply a power-supply voltage based on the electric power to the control circuit, wherein the control circuit has operating modes including a normal operating mode for outputting startup information relating to startup of the terminal device, and a registration mode for outputting registration information relating to registration of the terminal device with the master wireless device, wherein the terminal device is configured to:
transmit the registration information to the master wireless device in the registration mode;
shift to the normal operation mode at a startup of the terminal device due to the movement of the terminal device after transmitting the registration information to the master wireless device based on timing of a plurality of startups of the terminal device, wherein the terminal device obtains information of the timing of the plurality of startups of the terminal device as an output pattern, wherein, when a waveform of the power-supply voltage rises, the control circuit obtains a digit composing the output pattern based on a time interval from a preceding startup of the terminal device to a next startup of the terminal device, and wherein the control circuit shifts the normal operating mode to the registration mode when the output pattern coincides with a predetermined output pattern and otherwise keeps the operation mode in the normal operating mode; and
transmit the startup information in the normal operating mode shifted at the startup of the terminal device, wherein the receiver circuit receives the transmitted startup information, and wherein, in response to the received startup information, the master wireless device allows the terminal device to be paired with the master wireless device.

* * * * *